United States Patent [19]

Wolf et al.

[11] Patent Number: 5,092,775

[45] Date of Patent: Mar. 3, 1992

[54] PRISM PROMPTER

[76] Inventors: Rudolf E. Wolf, 6001 Sun View Rd., Yorba Linda, Calif. 92686; Glenn E. Eversole, 1417 11th St., Manhattan Beach, Calif. 90266; Richard A. Ward, 3041 C Bradford Pl., Santa Ana, Calif. 92707

[21] Appl. No.: 927,281

[22] Filed: Nov. 5, 1986

[51] Int. Cl.$^5$ ................. G09B 19/00; A63H 33/00
[52] U.S. Cl. ..................... 434/118; 434/402; 434/403; 446/488
[58] Field of Search ............... 434/118, 402, 403, 430; 493/968, 55, 153, 162, 295; 446/80, 109, 487, 488

[56] References Cited

U.S. PATENT DOCUMENTS

| | | |
|---|---|---|
| 33,419 | 10/1900 | Kingsley . |
| 167,030 | 8/1875 | Smith ............................ 434/195 |
| 463,230 | 11/1891 | Hooly . |
| 550,503 | 11/1895 | Pierce, Jr. ...................... 434/403 |
| 916,606 | 3/1909 | Roussel . |
| 1,820,209 | 8/1931 | Bacon ............................ 434/227 |
| 2,476,194 | 7/1949 | Hollowell ......................... 35/77 |
| 2,723,643 | 11/1955 | Weiss ............................ 116/133 |
| 2,797,512 | 7/1957 | Sieve ............................. 40/107 |
| 2,958,251 | 11/1960 | Calabro .......................... 84/477 |
| 3,008,059 | 11/1961 | Gorsuch et al. ................ 307/141.8 |
| 3,364,600 | 1/1968 | Patterson ........................ 434/402 |
| 3,364,603 | 1/1968 | Tate, Jr. ......................... 40/10 D |
| 3,462,857 | 8/1969 | Glass .............................. 35/77 |
| 3,574,957 | 4/1971 | Bello-Bridick .................... 35/76 |
| 3,914,889 | 10/1975 | Wagner ........................... 40/63 |
| 4,158,921 | 6/1979 | Stolpen ........................... 434/403 |
| 4,466,798 | 8/1984 | Conroy ........................... 434/118 |
| 4,528,763 | 7/1985 | Ahlgren .......................... 40/505 |
| 4,531,918 | 7/1985 | Coquil et al. .................... 434/118 |

FOREIGN PATENT DOCUMENTS 66920 4/1945 Fed. Rep. of Germany .

Primary Examiner—David A. Scherbel
Assistant Examiner—Kien Nguyen
Attorney, Agent, or Firm—H. Fredrick Hamann; George A. Montanye; Tom Streeter

[57] ABSTRACT

A freestanding visual aid is disclosed which includes instructional material displayed on multiple sufaces of a geometric object to allow the selective display of indicia representing information, on at least one of the surfaces, in a resting position of the geometric object. The indicia displayed by each face of the freestanding object is preferably related to one of a plurality of modes of operation of an apparatus or system with which the visual aid is used. Each surface, for example, may include an explanation of the key functions and command language applicable to a different computer program when the visual aid is used in connection with the operation of a computer or microprocessor system. The freestanding object allows immediate selection of the appropriate instructional information represented by the indicia on a given surface for the particular program employed by the computing system.

2 Claims, 2 Drawing Sheets

PRISM PROMPTER

BACKGROUND OF THE INVENTION

The present invention relates to a visual aid for selectively presenting information and, more particularly, to a freestanding, multiple-surfaced object, having indicia on each surface relating to instructional information concerning one of a plurality of modes of operation of a computer system.

There are known, in the prior art, a variety of devices and objects for displaying information in connection with the operation of equipment. Such devices are designed to rapidly and conveniently provide visual information to the operator of such equipment, so that its operation can be easily ascertained or its use in connection with the practice of other methods can be easily followed.

By way of example, in U.S. Pat. No. 3,364,600, there is shown a device for sequentially presenting diagnostic and corrective instructional information for use with heart-restarting equipment. The device includes a pyramid-shaped object having multiple surfaces, each of which displays instructional information in such a manner that each of the surfaces containing instructional information can be sequentially displayed to an operator of the heart-restarting equipment.

In still another example of prior display devices, U.S. Pat. No. 1,820,209 discloses an educational device which includes instructional material for use in connection with a typewriting machine. The display device is formed by providing the instructional indicia in a form that can be easily supported and displayed adjacent to a typewriting machine for providing lessons to an operator.

In a related art, U.S. Pat. No. 2,797,512 shows the use of a multisurfaced object, wherein the surfaces each display indicia representing the days of the month so that the object forms a dodecahedron calendar. However, as in the case of the above-noted prior art patents, the object does not provide individual surface indicia related to various operations or multiple functions of a common system.

In addition to the above, there are numerous other display devices known in the prior art which display indicia on the multiple surfaces of various objects for creating a visual display of information. More particularly, a plurality of objects may be positioned adjacent to one another so that when one surface of each of the objects is displayed, a predetermined picture or arrangement of information appears, and when a second surface of each of the objects is displayed with one another, another sequence of information or picture appears. In each instance, however, the particular configuration of the object or the mechanism for its display is somewhat complex or fails to provide a display of indicia on its respective surfaces which is related to a variety of operations or function of a common system.

With the proliferation of computing systems, there is a special need for displaying information in connection with the use of a variety of computer software. More specifically, a computer system normally includes a typewriter-like keyboard which enables the entry of selected information and commands by the depression of a particular key on that keyboard for the use and operation of the system. The keys are also used to enter computer software command information in a typed format in connection with a particular program to cause certain functions to be performed by the computer. In any computer system, the particular functions performed by each of the keys or the commands entered or typed as input may vary-depending upon the particular program employed, and repeated reference must be made to the instructional books and material provided with the program to enable an operator to successfully interface with the program used on the computer system.

By way of example, a computer system may use software which enables it to work as a word processor in one instance, to provide spreadsheet analysis in another instance, or to provide data management in still a third instance. In each mode of operation, the function keys on the keyboard and the word commands entered through the keyboard will be unique for the particular software being used. Accordingly, during training, repeated references must normally be made to the instructional books in each mode of operation to allow an operator to produce the desired results using the computer system. The repeated reference is inefficient and inhibits optimal use of the computer system. As a result, there is a continuing need for improvements designed to aid an operator in his utilization of a computer system.

The present invention has, therefore, been developed to overcome the shortcomings of the above known and similar techniques, and to provide a visual aid or display device which enables the more efficient use of a multimode computer system.

SUMMARY OF THE INVENTION

In accordance with the present invention, a freestanding visual aid is constructed using a multisurfaced, freestanding object having indicia on each surface which relate to one mode of operation of a multimode computer system. The freestanding object is constructed so that one of the surfaces containing the indicia supports the object during use, and the surfaces of the object are interrelated such that, during that support, at least one of the other surfaces is positioned to visually display the indicia contained on that other surface for use in connection with one of the modes of operation of the computer system. In the preferred embodiment, the freestanding visual object is constructed as a triangular tube formed by folding a rectangular sheet along three equally-spaced parallel lines extending lengthwise on the surface of the sheet. Indicia representing instructions relating to the operation of the computer system in one mode is displayed in each of three adjacent sections of the four sections formed by the parallel lines extending lengthwise on the sheet. After entry of the information on the sheet, the sheet is folded along the indicated lines to produce a triangular tube having three surfaces, each of which contains information relating to a different mode of operation of the computer system. The arrangement is such that at least one surface displays the indicia contained on its surface while the display object is supported by a second surface containing indicia relating to a different mode of operation.

It is therefore a feature of the invention to provide an improved instructional device relating to multiple functions or operations of a common system.

It is a further feature of the invention to provide a freestanding, multisurfaced object having indicia on each surface relating to a different mode or function of a multimode or multifunction system.

Still another feature of the invention is to provide a freestanding visual aid which is capable of rapidly conveying instructional information relating to various modes of operation of a common system.

A further feature of the invention is to provide a freestanding visual aid which conveys information to an operator by displaying on one surface that information related to a particular mode of operation.

Yet still a further feature of the invention is to provide a freestanding visual aid wherein each of a plurality of surfaces has indicia relating to a different mode of operation of a system, configured such that one of the surfaces supports the freestanding object while another of the surfaces displays indicia representing a selected mode of system operation.

Still yet a further feature of the invention is to provide a freestanding visual aid which is easily and inexpensively constructed to display different sets of instructional information.

These and other objects, advantages and novel features of the invention will become apparent from the following detailed description when considered with the accompanying drawings wherein:

BRIEF DESCRIPTION OF THE DRAWINGS

FIG. 3 is a schematic perspective view showing the folding of the sheet depicted in FIG. 2 to form the freestanding visual aid shown in FIG. 1.

DETAILED DESCRIPTION OF THE PREFERRED EMBODIMENT

Figure 1:
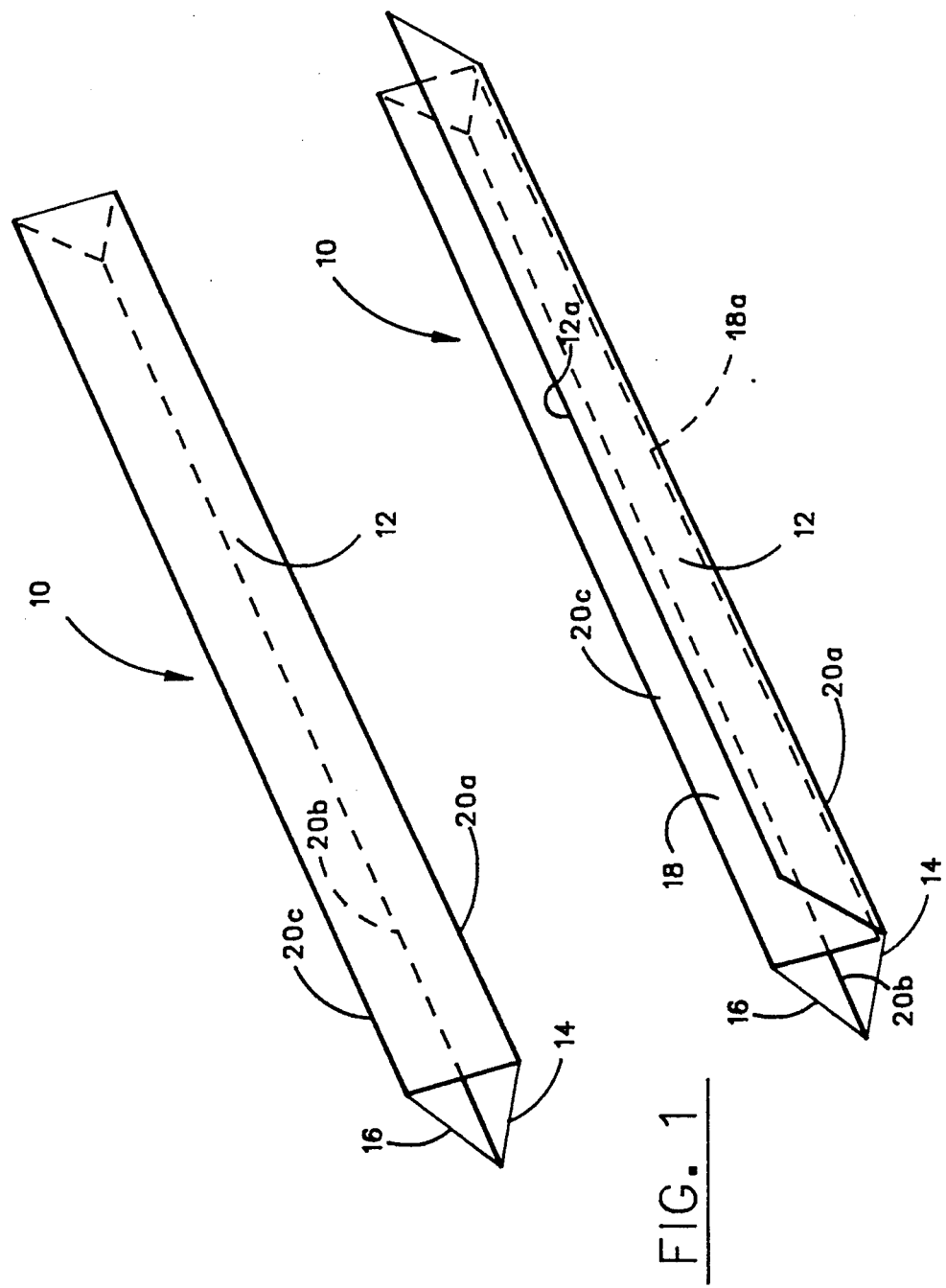
FIG. 1 is a schematic perspective view of the freestanding visual aid constructed in accordance with the present invention.

Referring now to the drawings, wherein like numerals are used to show like elements throughout, there is disclosed a freestanding visual aid 10 constructed in accordance with the present invention. The description of the freestanding visual aid will be made with reference to a computer system for purposes of illustration only, it being understood that the visual aid may be used in connection with a variety of other applications requiring different indicia representing instructional information for a plurality modes of operation of a common device or system.

Referring first to FIG. 1, the visual aid 10 is constructed as a triangular tube formed by the intersection of three identical rectangular surfaces: 12, 14 and 16. Surfaces 12, 14 and 16 are identical so that the cross-section of the tube is represented as an equilateral triangle. Each of the surfaces 12, 14 and 16 contains indicia relating to a particular mode of operation of a computer system, as will be more particularly described with respect to FIG. 2. In addition to containing the indicia, the surfaces forming the triangular tube are so arranged that one of the surfaces containing indicia (14 in FIG. 1) supports the visual aid 10 so that at least one of the other surfaces (12 in FIG. 1) is displayed to an operator to enable visual observation of the indicia on surface 12 relating to a particular mode of operation of the computer system.

The visual aid 10 of FIG. 1 is constructed as a freestanding, multisurfaced object, wherein the term "freestanding", for the purposes of this disclosure, is defined as an object having multiple surfaces arranged such that each will support the object for display on an adjacent, underlying, support surface, in the same manner as each of the other lurality of surfaces. More particularly, the triangular tube 10 as depicted in FIG. 1 has surfaces 12, 14 and 16, each of which will support the tube in a display position on an underlying surface, and each of which contains indicia relating to a particular mode of operation. Accordingly, the visual aid 10 may be easily positioned to provide instructional information (represented by the indicia) with respect to any given mode of operation without complex support structures while retaining the ability to display additional instructional material for other modes of operation by merely rotating the triangular tube. Regardless of the position of the triangular tube, it is supported in the same manner and provides at least one display surface having the desired indicia.

Although the freestanding visual aid 10 is depicted as a triangular tube in FIG. 1, it will be apparent that other geometric configurations could be employed to display the instructional material. By way of example, the tube 10 could be replaced by a rectangular tube having a square or octagonal cross-section or any tube of any other configuration having multiple surfaces arranged so that any indicia-containing surface supports the tube in one position to expose at least one other surface in a display position.

Figure 2:
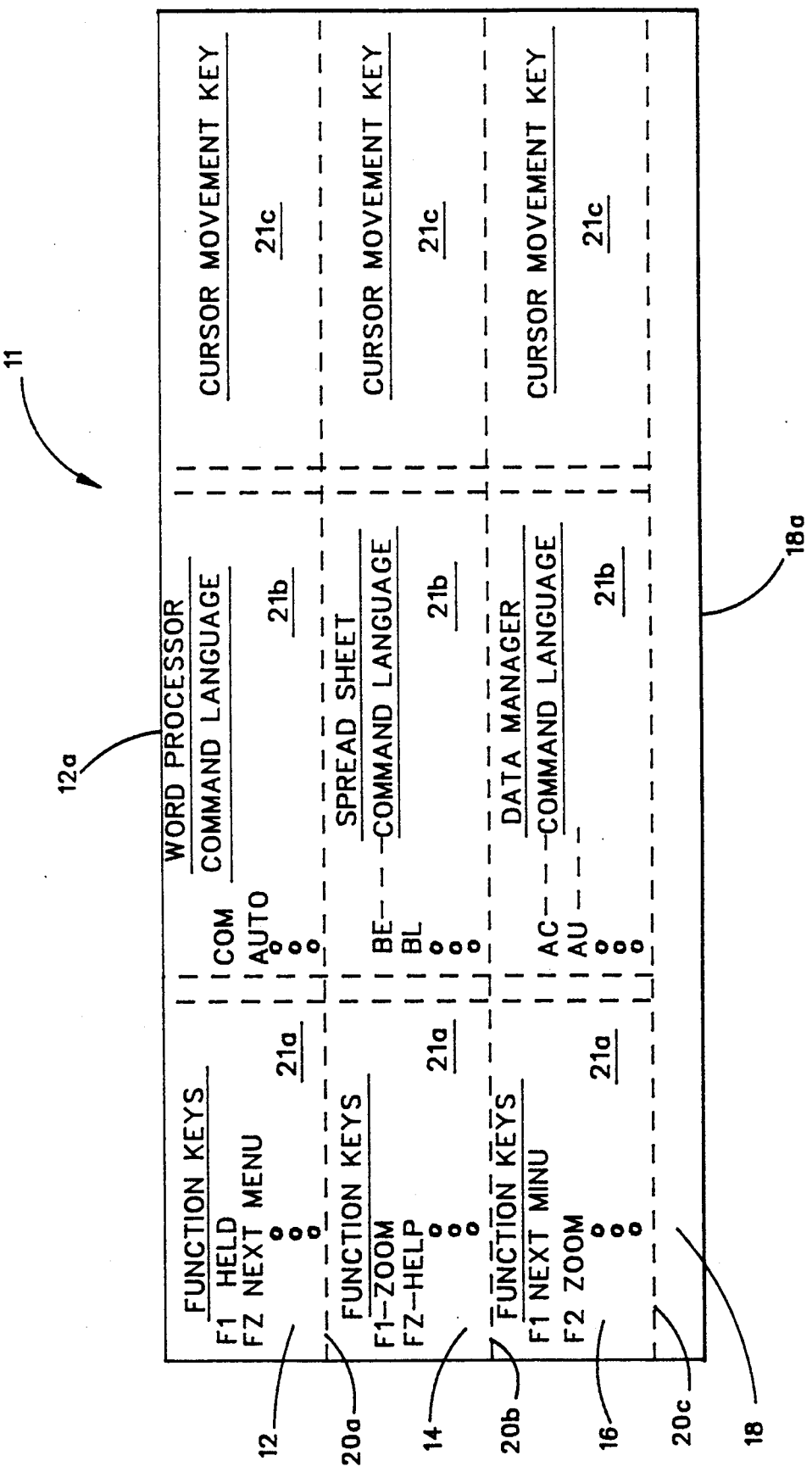
FIG. 2 is a schematic diagram showing a method of construction of the freestanding visual aid depicted in FIG. 1.

Referring now to FIG. 2, there will now be described a technique for forming the freestanding visual aid 10 shown in FIG. 1. In accordance with the present invention, a flat rectangular sheet 11 (for example, paper or lightweight cardboard, or similar material) may be selected for constructing the triangular tube to form the freestanding visual aid 10. Initially. The sheet 11 may be marked or divided into a plurality of lengthwise sections 12, 14 16 and 18, which are of identical size and shape, and which may be formed by inscribing a plurality of parallel lines, 20a, 20b and 20c, equally spaced, lengthwise from one another and parallel to the lengthwise edges 12a and 18a of the sheet 11. Lines 20a, 20b and 20c may be inscribed in any typical fashion by marking or otherwise to form the lines along which sheet 11 will be folded to assemble the visual aid 10.

Referring again to FIG. 2, each of the sections 12, 14 and 16 contain indicia relating to instructional information concerning a particular mode of operation of the computer system with which the visual aid 10 is to be used. More particularly, an operator may desire to use three different software programs in connection with operation of the computer, so that, in each of three instances, it performs as a word processor, spreadsheet, or data manager, depending upon its mode of operation. Sections 12, 14 and 16 are thus inscribed with the corresponding indicia so that: the instructional information relating to the word processor mode of operation is contained in a visually readable format in section 12; the instructional material for the spreadsheet mode of operation is inscribed in a visually readable format in section 14; and the instructional material for the data manager mode of operation is contained in a visually readable format in section 16. In each instance, sections 12, 14 and 16 may contain different types of information related to that particular mode of operation, which in the present example of FIG. 2, is identified as information related to the function of the keyboard keys, command language and cursor movement keys in subdivisions 21a, 21b and 21c, respectively. As shown in FIG. 2, the instructional information is displayed in lines parallel to the lines 20a, 20b and 20c so that the instructional information is easily perceived by an operator when the freestanding visual aid 10 is supported to display the indicia on at least one surface (12 in FIG. 1) during use.

As will be appreciated, the indicia may be entered onto sheet 11 in the appropriate sections 12, 14 and 16, by typewriting, printing or any other conventional method. Because of the initial use of the flat sheet 11 in the construction of the tube forming visual aid 10, the production of the freestanding visual aid may be easily implemented in a less complex and less costly manner than other techniques known in the art. Once the instructional material has been entered in each of the sections 12, 14 and 16, the sheet 11 may then be folded along each of the lines 20a, 20b and 20c in such a manner that each of the sections 12, 14 and 16 form an exposed surface of the triangular tube as shown in FIG. 1.

As more particularly shown in FIG. 3, the folding is accomplished by folding section 18 towards the side of the sheet opposite to that side containing the indicia so that the lengthwise edge 18a of section 18 is positioned on the line 20a. The section 12 is also folded along line 20a towards the opposite side of the sheet on which the indicia is printed, so that its lengthwise edge 12a contacts fold-line 20c to dispose section 12 in contact with section 18. The contacting surfaces between section 18 and 12, as shown in FIG. 3, may be attached by glueing or any other conventional method of attachment to thereby result in the finished triangular tube forming visual aid 10 depicted in FIG. 1.

In its final configuration of FIG. 1, the resulting triangular tube lD is a freestanding object which may be supported on an underlying support surface by any one and all of the surfaces 12, 14 and 16 containing indicia while still providing at least one surface (12 or 16) in FIG. 1) which is disposed in a position to visually display the informational material to an operator of the computer system. Regardless of the position of surface 12, 14 or 16 which supports the freestanding visual aid, there is a surface displayed to an operator which exposes indicia representing instructional material. As a result, there is no requirement for special mounting apparatus or complex mechanical controls to enable the support and display of the appropriate indicia for use in connection with a selected mode of operation of the computer system. In the present example, the display is attained by merely rotating the visual aid 10 to rest on a different surface 12, 14 or 16 so that the appropriate indicia on the desired surface is displayed to the operator.

In contrast to the prior art, the above described visual aid 10 can be easily constructed and produced in mass quantities at low cost for distribution and assembly. The sheet 11 could easily be incorporated as part of the packing material or advertisement or promotional material included with the sale of software for a computer system or as a perforated portion of that material. Alternatively, the visual aid 10 could be formed as a solid triangular body having the same exterior appearance as the triangular tube with indicia imprinted on each of the exposed surfaces, and used in the same manner as that described above for display of instructional material to an operator of a computer system. Since the supporting surface of the visual aid 10 contains indicia itself, there is never any requirement that the visual aid 10 be oriented in any particular manner or position to provide support in order to obtain the display of appropriate instructional material. This facilitates the easy adoption and use of the visual aid 10 in connection with different modes of computer system operation.

Although the invention has been described with respect to a particular form and construction of the freestanding visual aid, it should be appreciated that other configurations and material may be employed in accordance with the teachings of the present invention. By way of example. The object could be formed as a multisurfaced square or octagonal body having indicia on each of the exposed surfaces in the same manner described above with respect to the triangular tube 10. Likewise, the sheet 11 could be formed of any material and imprinted in any manner capable of allowing the visual display of the instructional information upon final assembly of the visual aid 10. As was noted above, other constructions of the visual aid 10 could include solid objects of similar configuration imprinted with indicia on each of a plurality of exposed surfaces, consistent with the description provided herein.

Obviously, many other modifications and variations of the invention are possible in light of the above teachings. It is, therefore, to be understood that, within the scope of the appended claims, the invention may be practiced otherwise than as specifically described.

What is claimed is:

1. An instructional device comprising:
a freestanding, multisurfaced object wherein the surfaces are constructed and arranged with respect to one another such that at least one surface is exposed for visual observation when the object is supported by any other surface; and
indicia disposed on each of said surfaces wherein the indicia on each surface relates to a different mode of operation of a common system, and wherein the indicia on each surface pertains to a different mode of operation of a computer.

2. An instructional device comprising:
a freestanding triangular object having three surfaces, wherein the surfaces are constructed and arranged with respect to one another such that at least one surface is exposed for visual observation when the object is supported by any other surface; and
indicia disposed on each of said surfaces wherein the indicia on each surface relates to a different mode of operation of a common system, the indicia on a first surface relating to instructional material concerning a word processor mode of operation of a computer, the indicia on a second surface relating to instructional information concerning a spread sheet mode of operation of a computer, and the indicia on a third surface relating to instructional material concerning a data manager mode of operation of a computer.

* * * * *